UNITED STATES PATENT OFFICE.

CHARLES FOXWELL, OF BALTIMORE, MARYLAND.

DISTILLING COMBUSTIBLE MATERIALS.

1,255,593.  Specification of Letters Patent.  Patented Feb. 5, 1918.

No Drawing.  Application filed February 23, 1917.  Serial No. 150,560.

*To all whom it may concern:*

Be it known that I, CHARLES FOXWELL, a citizen of the United States, residing at Baltimore, in the State of Maryland, have invented a certain new and useful Process of Distilling Combustible Materials, of which the following is a specification.

The present invention relates to the treatment of certain combustible materials, such as coal, and has for its object, the recovery of by-products such as benzol and ammonia, therefrom in greater quantities than has heretofore been obtained.

Heretofore, benzol and ammonia have generally been recovered from combustible materials by burning the materials in by-product ovens without prior treatment. Such a process has never yielded the entire possible by-product content of combustible material, such as coal, in that under such process the rise of temperature is too fast. As is well known a very high temperature will produce a high yield of gas, due to the oxygen present being expelled as carbonic oxids, but a low yield of ammonia tar and coke. The reverse exists with a low temperature, the yield of ammonia tar and coke being high, and the yield of gas being low, due to the oxygen present being chiefly converted to water.

In the present invention it is proposed to supply water during destructive distillation, by the admixture of a chemical substance which will not give up its entire water content until after a degree of heat has been reached in the distillation process, that will have caused all of the desired by-products to be distilled over. This is preferably accomplished by treating the combustible materials before they are distilled, with a water solution of calcium chlorid and an oxygen-bearing compound of boron. This will retard combustion owing to the water being slowly expelled from the added solution, some of the water being retained even until after attainment of a temperature sufficient to volatilize all of the distillate sought after. In other words, by the time all the water has been expelled from the chemical compound the by-products will have been distilled over, and the fire may thereafter be regulated with respect to the product, for example coke, to be obtained from the base of the combustible material.

Commercial borax ($Na_2B_4O_7$) serves well for the boron compound and this being dissolved in water, together with calcium chlorid, in the proportions of say, 382 pounds of commercial borax to 918 pounds of calcium chlorid of 72% purity, will make the chlorin and boron molecularly equivalent. In practice, the material is sprinkled with the solution in sufficient quantity, the material being thoroughly mixed or turned over during the treatment. When so treated, the material is ready to be distilled.

I claim:—

1. The process of recovering ammonia and light coal tar oils from combustible materials which consists in distilling such combustible materials in a by-product oven, in the presence of a substance having the characteristics of borax together with a water-bearing substance that retains a portion of its water content until the combustible material has reached a temperature beyond that at which the said light oils will distil over.

2. The process of distilling combustible materials, which consists in treating such materials with a mixture of calcium chlorid with an oxygen-bearing compound of boron, and then distilling the combustible materials so treated, in a by-product oven.

3. The process of recovering benzol and ammonia from combustible materials which consists in treating the combustible materials with a solution of calcium chlorid and borax and then distilling said combustible materials in a by-product oven.

4. The process of recovering benzol and ammonia from combustible materials which consists in treating the combustible materials with a solution of calcium chlorid and borax in about the proportions of 382 pounds of commercial borax to 918 pounds of calcium chlorid and then distilling said combustible materials in a by-product oven.

The foregoing specification signed at Baltimore, Maryland, this 21st day of February, 1917.

CHARLES FOXWELL.